July 20, 1965     J. DOBSA     3,196,345
VOLTAGE TRANSFORMER WITH A PLURALITY OF SECONDARY WINDINGS
Filed Oct. 20, 1961

INVENTOR.
Josip Dobsa
BY
Pierre Schiffler & Parker
Attorneys

United States Patent Office 3,196,345
Patented July 20, 1965

3,196,345
VOLTAGE TRANSFORMER WITH A PLURALITY OF SECONDARY WINDINGS
Josip Dobsa, Wettingen, Aargau, Switzerland, assignor to Aktiengesellschaft Brown, Boveri & Cie, Baden, Switzerland, a joint-stock company
Filed Oct. 20, 1961, Ser. No. 146,569
Claims priority, application Switzerland, Oct. 21, 1960, 11,818/60
2 Claims. (Cl. 323—48)

The present invention relates to voltage transformers and particularly to those designed to furnish voltages for measuring instruments and the like connected to high potential as well as to other instruments and like devices which are connected to ground potential.

Voltage transformers are commonly used for the purpose of transforming a high voltage, for which measuring instruments are not designed, to a low voltage thereby to protect the instruments and protective devices against damage from high voltage. The secondary circuits of such transformers are grounded at one point, in order to fix the potential of the secondary circuit. Without the grounding, the secondary circuit would acquire a potential determined mainly by the capacities of the voltage transformer.

Even when transformers have several secondary windings, for example, for separately supplying measuring instruments and protective devices, all the secondary circuits are grounded at one point. In some cases, however, the instruments are to be situated at points which lie at a high potential. For example, in the case of voltage meters or voltage releasers installed on switches or in certain measuring circuits, the instruments will lie at a high potential. Until now it has been necessary in these cases to use separate transformers whose secondary windings are not grounded but determined by the potential of the high voltage side.

The principal object of the invention is to provide an improved and more simplified transformer construction which enables both ground-connected secondary windings and high-voltage connected secondary windings to be incorporated in the same transformer. This results in a great potential difference between the different secondary windings so that these windings must be mutually completely insulated from high voltage and the present invention provides for this requirement.

In the drawings which accompany the specification, several different embodiments of the invention are presented and will be described hereinafter in detail.

Figure 1:
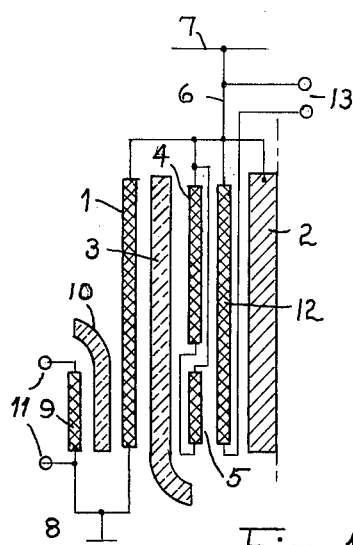
FIG. 1 illustrates one suitable embodiment of the invention.

With reference now to FIG. 1, the improved transformer is seen to include a primary winding 1 constructed in known manner and arranged along an iron core 2, the primary winding being separated from core 2 by an insulator 3 and by windings 4 and 5 located between insulator 3 and core 5 which serve to shift the magnetic field coupling the primary and secondary windings. One end of primary winding 1 is connected via a conductor 6 to the high voltage line 7 and the other end of winding 1 is grounded at 8.

One secondary winding 9 is inductively coupled with the lower part of transformer primary 1 the end of which is grounded, and is insulated from the primary by an insulator 10 placed between the two windings. One end of secondary winding 9 is grounded and the voltage for measuring or other desired purposes is taken from terminals 11 connected respectively to the opposite ends of secondary winding 9.

Another secondary winding 12 is arranged on core 2 and lies closest thereto, i.e., winding 12 is located between core 2 and the windings 4 and 5 and has one end thereof connected to the high voltage line 7 via conductor 6. The opposite ends of secondary winding 12 are connected to terminals 13 from which another voltage for measuring or other desired purposes is taken. The iron core 2 is also connected to the high voltage line 7 which departs from conventional practice of grounding the core. The windings 4, 5 which serve to improve the inductive coupling between the primary and secondary windings 1 and 9 are also connected at one end thereof to the high voltage line 7.

Figure 2:
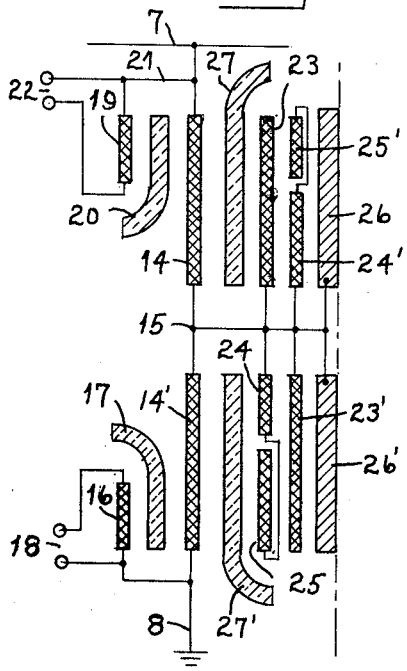
FIG. 2 illustrates a second embodiment of the invention similar to that of FIG. 1 but wherein the transformer windings are cascaded.

In the embodiment illustrated in FIG. 2, which is somewhat similar to that of FIG. 1, the primary winding is composed of two sections cascaded in series, there being one secondary winding associated with one section of the primary and another secondary winding associated with the other section of the primary. In this embodiment, the two series connected sections of the primary winding are designated 14, 14' and a mid-tap between the two is indicated at 15. The upper end of primary winding section 14 is connected to the high voltage line 7 and the lower end of the other primary winding section 14', is connected to ground which is indicated at 8. One secondary winding 16 is inductively coupled with that part of the primary winding section 14' which is adjacent the ground connection 8 and is isolated electrically from the same by means of an insulator 17. As before, one end of secondary winding 16 is grounded and terminals 18 are connected to the opposite ends of this winding to provide the voltage desired for measuring or other purposes.

Another secondary winding 19 is inductively coupled with the other primary winding section 14, and insulated therefrom by insulator 20. One end of winding 19 is connected to the high voltage line 7 via conductor 21 and terminals 22 are connected to the opposite ends of winding 19 to provide the desired voltage output. As in the embodiment of FIG. 1, field shifting windings 23, 24, and 25 are associated with secondary winding 16 and field shifting windings 23', 24', and 25' are associated with secondary winding 19, and all of these field shifting windings are connected to the tap point 15 between primary winding sections 14, 14' which establishes a potential intermediate that which obtains between the high voltage line 7 and ground 8.

The primary winding section 14 is arranged on one core part 26 and is insulated therefrom and from windings 23, 24' and 25' by an insulator 27, and the other primary winding section 14' is arranged on a second core part 26' and similarly insulated therefrom and from windings 23', 24 and 25 by insulator 27'. Core parts 26, 26' are connected to the intermediate potential tap point 15.

Figure 3:
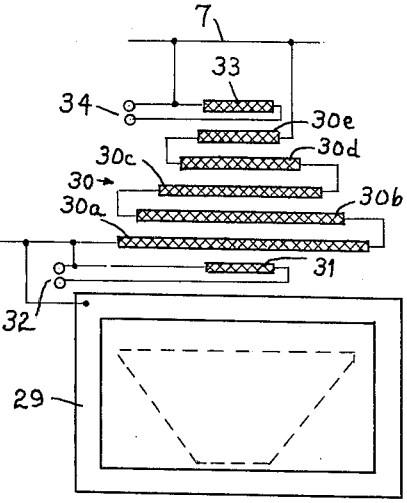
FIG. 3 illustrates another embodiment of the invention wherein the windings are applied in layer form, i.e. the primary winding is composed of several superposed layers connected in series.

In FIG. 3 is illustrated still another embodiment of the invention wherein the primary and secondary windings of the transformer are wound around one leg of a rectangular closed core 29. The primary winding 30 is composed of five superposed layers 30a to 30e connected in series. One end of the outermost layer 30e of this winding is connected to the high voltage line 7 and one end of the innermost layer 30a of this winding is connected to ground 8. One secondary winding layer 31 located adjacent the core 29 and next to primary winding layer 30a has one end connected to ground 8, and terminals 32 at opposite ends of this secondary winding provide the voltage output. Another secondary winding layer 33 located remotest from the core and next to primary layer 30e has one end connected to the high voltage line 7, and terminals 34 connected to the ends of the winding 33 provide the desired voltage output. Core 29, in this embodiment, is connected to ground 8. The broken lines shown at the inner side of the core leg simply represent an outline of the primary and secondary windings at this location.

Figure 4:
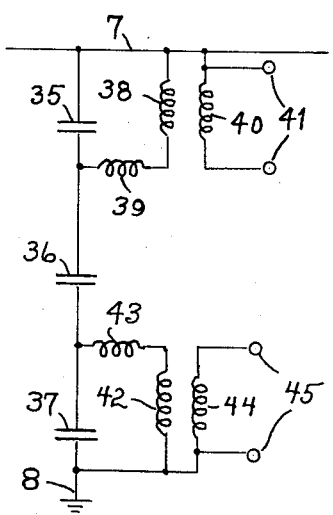
FIG. 4 illustrates a fourth embodiment wherein the transformer includes a capacitative type voltage divider for supplying different primary windings which are to be linked inductively with corresponding secondary windings connected to high potential and ground respectively.

In FIG. 4, a further embodiment of the invention is illustrated wherein it is seen that a voltage divider of the capacitative type is used, there being three capacitors 35, 36 and 37 connected in series between the high voltage line 7 and ground 8. One transformer has its primary 38 connected in series with a choke 39 and these two elements are connected across the capacitor 35 located closest to the high voltage line 7. Inductively coupled to winding 38 is a secondary winding 40. One end of this winding 40 is connected to the high voltage line 7 and the ends of this winding are connected to the voltage output terminals 41.

A sccond transformer has its primary 42 connected in series with a choke 43 and these two elements are connected across the capacitor 37 located closest to the ground point 8. One end of secondary winding 44, inductively coupled to primary winding 42, is connected to the ground point 8 and the ends of winding 44 are connected to the voltage output terminals 45.

In conclusion, the advantage inherent in each of the various embodiments which have been illustrated is that one obtains a more simple construction which permits connections to instruments or relays or other devices both at high voltage and also at ground potential.

I claim:
1. In a voltage transformer, the combination comprising a primary winding including a pair of winding sections connected in series between a high voltage line and ground, a distributed core comprising a pair of core parts on which said primary winding sections are respectively located, means electrically connecting said core parts to the mid-potential point lying between said primary winding sections, a secondary winding section on each said core part respectively and inductively coupled to the corresponding primary winding section, and pairs of output terminals connected respectively to said secondary winding sections, one end of one of said secondary winding sections being connected to said high voltage line and one end of the other secondary winding section being connected to ground.

2. A transformer as defined in claim 1 and which further includes field shifting winding sections located respectively on said core parts and connected electrically to said mid-potential point.

References Cited by the Examiner

UNITED STATES PATENTS 2,965,808  12/60  Lovinger _____ 315—326

FOREIGN PATENTS 316,775  4/34  Italy.
512,234  1/55  Italy.

LLOYD McCOLLUM, *Primary Examiner.*